United States Patent [19]

Mauney

[11] Patent Number: 4,896,890
[45] Date of Patent: Jan. 30, 1990

[54] OIL SCAVENGE CHECK VALVE APPARATUS

[75] Inventor: C. Richard Mauney, Mooresville, N.C.

[73] Assignee: Ingersoll-Rand Company, Woodcliff Lake, N.J.

[21] Appl. No.: 377,224

[22] Filed: Jul. 10, 1989

[51] Int. Cl.⁴ .............................................. F16J 15/16
[52] U.S. Cl. ........................................ 277/3; 277/15; 277/27; 277/70; 277/93 SD
[58] Field of Search ............. 277/3, 15, 27, 70, 93 SD

[56] References Cited

U.S. PATENT DOCUMENTS

| | | |
|---|---|---|
| 3,926,442 | 12/1975 | Muller . |
| 3,927,889 | 12/1975 | Adams et al. . |
| 4,128,248 | 12/1978 | Kabelitz ................................ 277/15 |
| 4,152,092 | 5/1979 | Swearigen . |
| 4,153,141 | 5/1979 | Methlie . |
| 4,245,844 | 1/1981 | Pohl et al. . |
| 4,300,772 | 11/1981 | Nissel . |
| 4,475,735 | 10/1984 | Smuda et al. . |
| 4,475,736 | 10/1984 | Lesiecki . |
| 4,496,032 | 1/1985 | Sommer . |
| 4,574,926 | 3/1986 | Bubak . |
| 4,657,495 | 4/1987 | Sakamaki et al. . |
| 4,749,283 | 6/1988 | Yokomatsu et al. . |

Primary Examiner—Robert G. Nilson
Attorney, Agent, or Firm—James R. Bell

[57] ABSTRACT

An oil seal, scavenge check valve apparatus includes a seal housing having external and oil-flooded sides, a shaft opening and a fluid opening. A shaft is rotatably and sealingly mounted in the shaft opening. A member is sealingly attached to the external side and spaced therefrom for defining a scavenge cavity adjacent the fluid opening. A first end of the fluid opening is in fluid communication with the scavenge cavity and a second end of the fluid opening is in fluid communication with the oil-flooded side. A flexible seal is normally closed to seal the second end of the fluid opening. The seal is responsive to pressure differences between the external and oil-flooded sides for moving between a normally closed and an open position. A backing plate is spaced from the oil-flooded side to limit movement of the flexible seal.

15 Claims, 1 Drawing Sheet

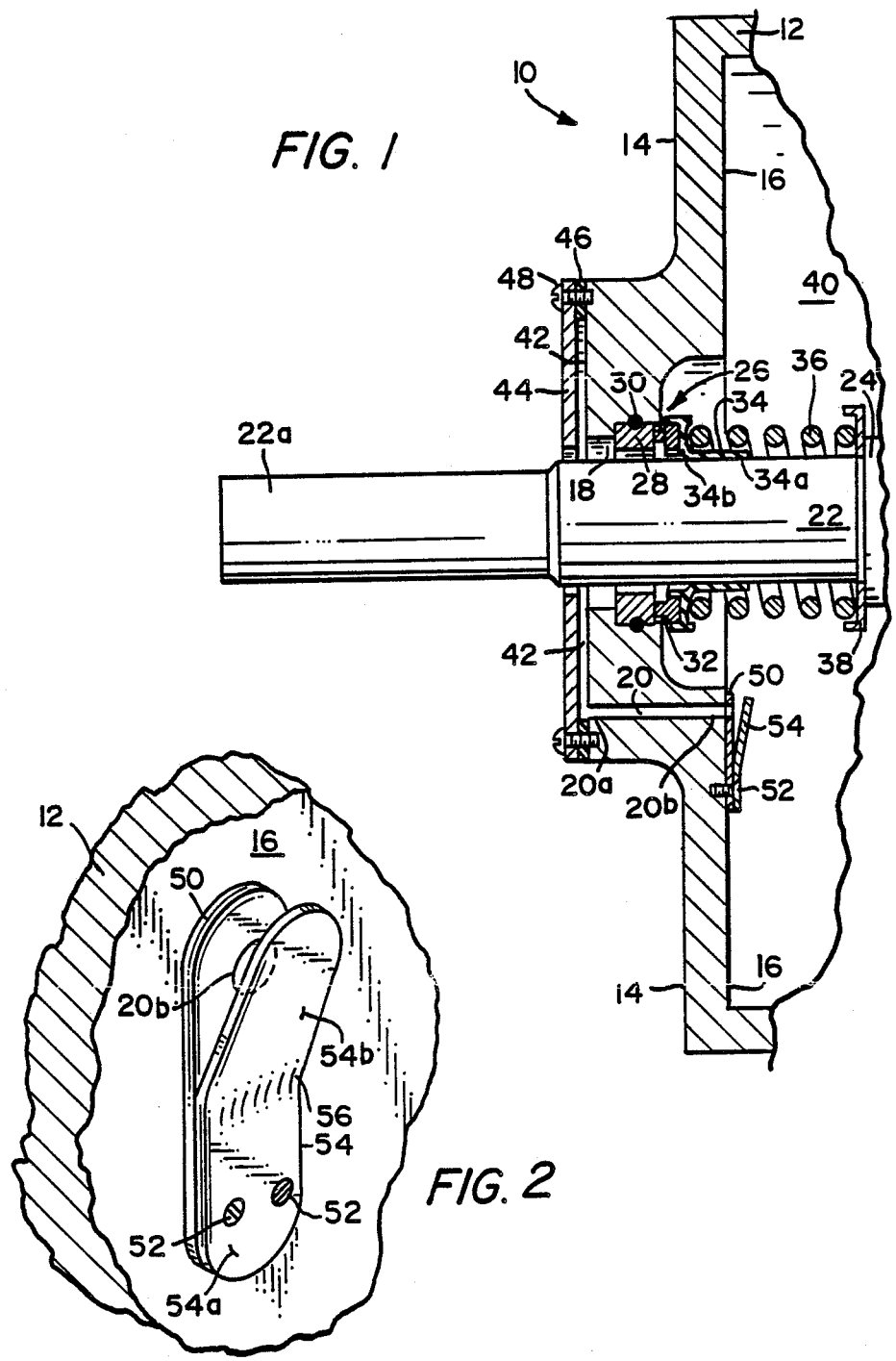

OIL SCAVENGE CHECK VALVE APPARATUS

BACKGROUND OF THE INVENTION

This invention relates generally to rotary oil-flooded compressors and more particularly to a scavenge check valve apparatus to be used with such compressors.

In rotary oil-flooded screw compressors, a shaft is rotatably mounted to extend externally of a seal housing. The portion of the shaft which extends through the seal housing comprises a driven end of the shaft. The driven end may include a V-belt pulley drive system.

Internally of the seal housing, the shaft is in an oil flooded area. A well-known mechanical face seal or carbon face seal limits most of the oil to the oil-flooded area. However, some of the oil leaks past the seal and onto the portion of the shaft which extends externally of the seal housing. The result is that the leaking oil is messy, may cause the belt drive to slip and, in the case of a belt formed of a rubber compound, the oil may cause eventual decomposition of the belt.

The foregoing illustrates limitations known to exit in present devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an oil seal, scavenge check valve apparatus including a seal housing having a first side, a second side, a shaft opening formed therethrough and a fluid opening formed therethrough. A shaft is sealingly mounted in the shaft opening. A first portion of the shaft is outside the housing and a second portion of the shaft is inside the housing. A first end of the fluid opening is in fluid communication with the first side. A second end of the fluid opening is in fluid communication with the second side. A seal means seals the second end of the fluid opening. The seal means normally closes the second end and is responsive to pressure differences between the first and second sides for moving between a normally closed position and an open position.

BRIEF DESCRIPTION OF THE DRAWING FIGURES

In the drawing:

FIG. 1 is a cross-sectional side view illustrating an embodiment of a portion of a compressor including the present invention; and FIG. 2 is an enlarged perspective view illustrating an embodiment of the seal of the present invention.

DETAILED DESCRIPTION

Figures 1, 2:
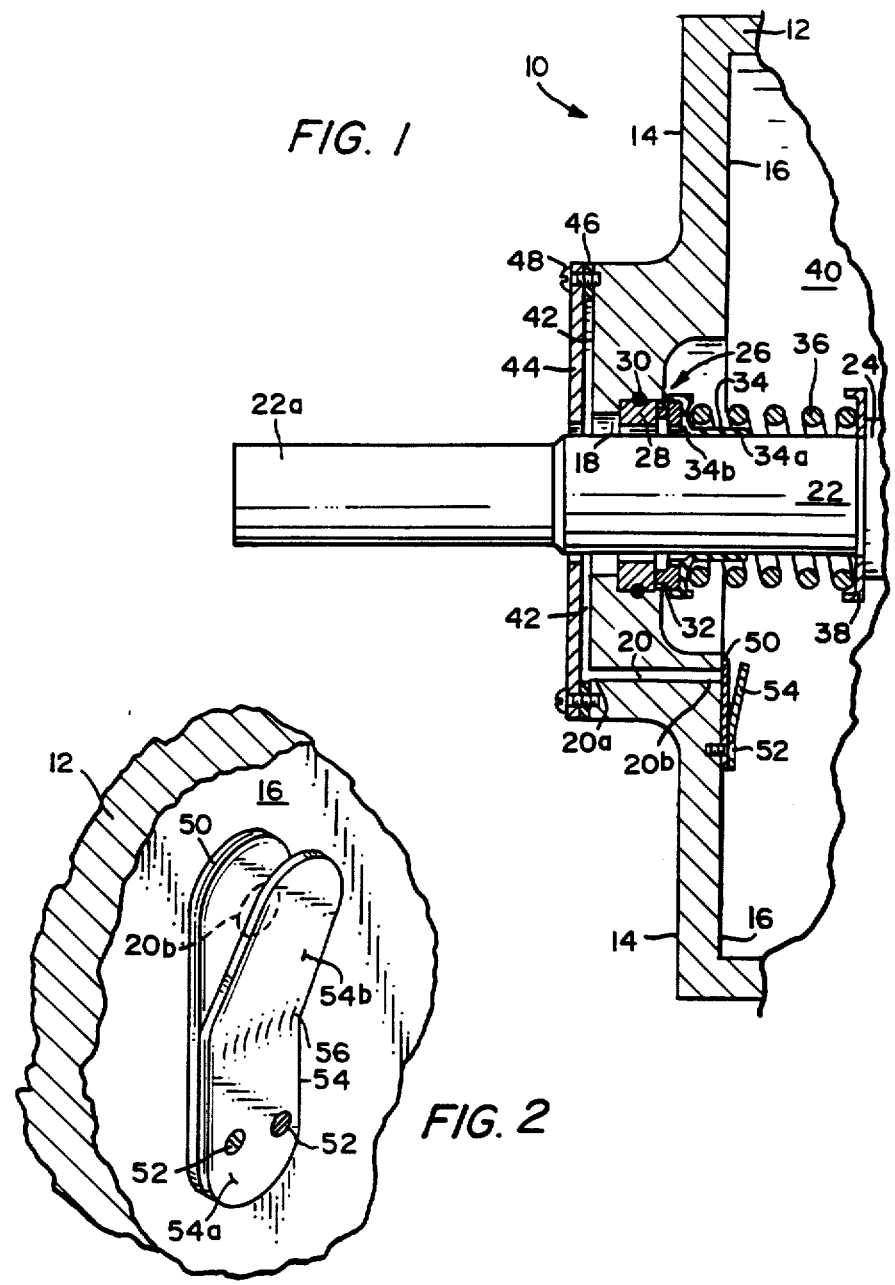

Referring now to FIG. 1, a portion of a rotary oil-flooded screw compressor is generally designated 10. A stationary seal housing 12 includes a first or external side 14, a second or internal side 16, a shaft opening 18 formed therethrough and a fluid opening 20 formed therethrough adjacent shaft opening 18.

A shaft 22 is rotatably mounted in the seal housing 12 in the well-known manner by bearings, not shown, which abut a collar 24 mounted on shaft 22. Shaft 22 is sealingly mounted in the seal housing 12 by means of a well-known mechanical or carbon face seal 26. Seal 26 includes stationary carbide ring 2 pressed into housing 12 in cooperation with a sealing O-ring 30. A carbon member 32 abuts carbide ring 28 and rotates with shaft 22 due to connection with a rubber boot 34. Boot 34 has a first end 34a in sealing engagement with shaft 22 and a second end 34b resiliently urged with carbon member 32 toward carbide ring 28, by means of a spring 36 compressed against a seat 38 retained by collar 24. However, despite the presence of boot 34, some oil may leak to the outside of seal housing 12.

As it is well known, an internal portion 40 of compressor 10, adjacent internal side 16, is oil-flooded and during operation, the internal oil-flooded portion 40 is at a pressure below atmospheric pressure. After shutdown of the compressor, however, when an associated inlet valve (not shown) closes, the pressure in the internal portion 40 is momentarily raised above atmospheric pressure. Thus, the external side 14 of seal housing 12 is continuously at atmospheric pressure whereas the internal portion 40 of compressor 10 is either at a pressure above atmospheric pressure, or at a pressure below atmospheric pressure, depending upon whether the compressor has just been shut down or is operating, respectively.

Should oil leak past any portion of the carbon face seal and move toward a drive end 22a of shaft 22, means are provided for scavenging such leaking oil and returning it to the oil-flooded internal portion 40 of compressor 10.

A scavenge cavity 42 is defined adjacent external side 14 of seal housing 12 adjacent shaft opening 18. Scavenge cavity 42 is formed by a scavenge cover 44 and a gasket 46 attached by suitable means 48 to side 14. Gasket 46 functions to provide a space between side 14 and cover 44 thus forming cavity 42, and also seals against leakage of oil from the scavenge cavity. Thus, gasket 46 is of a suitable material to accomplish the spacing and sealing functions. Cover 44 may be of any suitable material for retaining oil. Cover 44 must be made so there is very little clearance between its bore and rotating shaft 22. A preferred diametral clearance is 0.005 inches.

Fluid opening 20 has a first end 20a in fluid communication with scavenge cavity 42 and a second end 20b in fluid communication with internal portion 40.

In FIGS. 1 and 2, seal means such as a reed-type flat, elongated, flexible member 50 has an end attached to internal side 16 by a suitable means 52. Means such as a backing plate 54 is provided for limiting movement of flexible member 50 into internal portion 40 due to pressure in internal portion 40 being less than atmospheric pressure. Backing plate 54 is attached to internal side 16 in a manner such that a first portion 54a is abutment with flexible member 50 and a second portion 54b is spaced from internal side 16. Flexible member 50 is preferably formed of a synthetic material with sealing capabilities such as a rubber or polymer material. Backing plate 54 is preferably formed of a metal suitable of being formed into and retaining a shape, such as a sheet steel. Thus, backing plate 54 includes a bend 56 separating first portion 54a from second portion 54b.

In operation, when compressor 10 is in operation and pressure in internal portion 40 is less than atmospheric pressure, should oil leak past the shaft seal assembly, the leaked oil can collect in scavenge cavity 42. Due to the pressure differential on opposite sides of seal housing 12, i.e. pressure in internal portion 40 being less atmospheric pressure, flexible member 50 moves away from fluid opening 20 and backing plate 54 restricts movement of member 50. Oil collected in scavenge cavity 42 can return to internal portion 40 via opening 20. Upon shutdown of compressor 10, i.e. pressure in internal portion 40 being greater than atmospheric pressure, flexible member 50 is urged to a closed position against internal side 16 thus closing fluid opening 20 and retaining oil in internal portion 40.

The foregoing has described an oil seal, scavenge check valve apparatus incorporated into an oil-flooded screw compressor.

While this invention has been illustrated and described in accordance with a preferred embodiment, it is recognized that variations and changes may be made therein without departing from the invention as set forth in the claims.

What is claimed is:

1. An oil seal, scavenge check valve apparatus comprising:
   a seal housing having a first side, a second side, a shaft opening formed therethrough and a fluid opening formed therethrough;
   a shaft sealingly mounted in the shaft opening, the shaft having a first portion outside the housing and a second portion inside the housing;
   a first end of the fluid opening being in fluid communication with the first side;
   a second end of the fluid opening being in fluid communication with the second side; and
   seal means for sealing the second end of the fluid opening the seal means normally closing the second end and being responsive to pressure differences between the first and second sides for moving between a normally closed position and an open position.

2. The apparatus as defined in claim 1, wherein the fluid opening is adjacent the shaft opening.

3. The apparatus as defined in claim 1, including:
   means sealingly attached to the first side and spaced therefrom for defining a scavenge cavity therewith.

4. The apparatus as defined in claim 1, wherein the seal means is an elongated flexible flat member having an end attached to the second side.

5. The apparatus as defined in claim 4 including:
   means for limiting movement of the seal means.

6. The apparatus as defined in claim 5, wherein the means for limiting movement is a backing plate attached to the second side having a first portion in abutment with the seal means and a second portion spaced from the seal means when the seal means is in the closed position.

7. The apparatus as defined in claim 6, wherein the seal means is formed of a synthetic material.

8. The apparatus as defined in claim 7, wherein the backing plate is formed of metal and includes bend separating the first and second portions thereof.

9. An oil seal, scavenge check valve apparatus comprising:
   a seal housing having a first side, a second side, a shaft opening formed therethrough and a fluid opening formed therethrough;
   a shaft sealingly mounted in the shaft opening, the shaft having a first portion outside the housing and a second portion inside the housing;
   means forming a scavenge cavity adjacent the first side;
   a first end of the fluid opening being in fluid communication with the scavenge cavity;
   a second end of the fluid opening being in fluid communication with the second side; and
   seal means for sealing the second end of the fluid opening, the seal means normally closing the second end and being responsive to pressure differences between the first and second sides for moving between a normally closed position and an open position.

10. The apparatus as defined in claim 9, wherein the fluid opening is adjacent the shaft opening.

11. The apparatus as defined in claim 9, wherein the seal means is an elongated flexible flat member having an end attached to the second side.

12. The apparatus as defined in claim 11, including:
    means for limiting the movement of the seal means.

13. The apparatus as defined in claim 12, wherein the means for limiting movement is a backing plate attached to the second side having a first portion in abutment with the seal means and a second portion spaced from the seal means when the seal means is in the closed position.

14. The apparatus as defined in claim 13, wherein the seal means is formed of a synthetic material.

15. The apparatus as defined in claim 14, wherein the backing plate is formed of metal and includes a bend separating the first and second positions thereof.

* * * * *

UNITED STATES PATENT AND TRADEMARK OFFICE
CERTIFICATE OF CORRECTION

PATENT NO. : 4,896,890

DATED : January 30, 1990

INVENTOR(S) : C. Richard Mauney

It is certified that error appears in the above-identified patent and that said Letters Patent is hereby corrected as shown below:

The sheet of drawings should be deleted to be replaced with the sheet of drawings consisting of Figs. 1 and 2, as shown on the attached page.

Signed and Sealed this

Seventeenth Day of November, 1992

Attest:

DOUGLAS B. COMER

*Attesting Officer*   *Acting Commissioner of Patents and Trademarks*